US011958765B2

(12) United States Patent
Roeder et al.

(10) Patent No.: US 11,958,765 B2
(45) Date of Patent: Apr. 16, 2024

(54) COMBINED VOC MITIGATING AND ANTIMICROBIAL SYSTEMS

(71) Applicants: Jeffrey F. Roeder, Brookfield, CT (US); Trevor E. James, Plantsville, CT (US); Melissa A. Petruska, Newtown, CT (US); Peter C. Van Buskirk, Newtown, CT (US); Robert T. Henderson, III, Milford, CT (US)

(72) Inventors: Jeffrey F. Roeder, Brookfield, CT (US); Trevor E. James, Plantsville, CT (US); Melissa A. Petruska, Newtown, CT (US); Peter C. Van Buskirk, Newtown, CT (US); Robert T. Henderson, III, Milford, CT (US)

(73) Assignee: Sonata Scientific LLC, Danbury, CT (US)

( * ) Notice: Subject to any disclaimer, the term of this patent is extended or adjusted under 35 U.S.C. 154(b) by 0 days.

(21) Appl. No.: 17/579,558

(22) Filed: Jan. 19, 2022

(65) Prior Publication Data
US 2022/0144675 A1    May 12, 2022

Related U.S. Application Data

(63) Continuation-in-part of application No. 16/987,386, filed on Aug. 6, 2020, and a continuation-in-part of
(Continued)

(51) Int. Cl.
*B01J 21/06*        (2006.01)
*B01J 21/08*        (2006.01)
(Continued)

(52) U.S. Cl.
CPC ........ *C02F 1/725* (2013.01); *C02F 2101/322* (2013.01); *C02F 2209/003* (2013.01); *C02F 2305/02* (2013.01); *C02F 2305/10* (2013.01)

(58) Field of Classification Search
CPC . B01J 21/04; B01J 21/06; B01J 21/063; B01J 21/066; B01J 21/08; B01J 21/10;
(Continued)

(56) References Cited

U.S. PATENT DOCUMENTS

5,244,811 A * 9/1993 Matthews ............ G01N 31/005
                                                  436/159
5,439,652 A * 8/1995 Sczechowski ..... B01D 53/8668
                                                  422/186
(Continued)

*Primary Examiner* — Cam N. Nguyen
(74) *Attorney, Agent, or Firm* — Gregory Stauf (57) ABSTRACT

Fluid purification systems employing a monolithic composite photocatalyst to remove volatile organic compounds (VOCs) and/or pathogenic organisms are disclosed. Pairing of systems tuned to abate each of these materials are discussed in different configurations such as series and parallel, as well as combining systems to target both materials simultaneously. System configurations that allow a portion of the fluid stream to be purified are also disclosed as are configurations that allow regeneration of the photocatalyst. These features may be augmented by sensors that allow closed loop control of bypass and regeneration cycles in the systems.

30 Claims, 8 Drawing Sheets

Related U.S. Application Data application No. 17/481,279, filed on Sep. 21, 2021, now abandoned, which is a continuation-in-part of application No. 17/343,723, filed on Jun. 9, 2021, said application No. 17/481,279 is a continuation-in-part of application No. 16/987,386, filed on Aug. 6, 2020, said application No. 17/343,723 is a continuation-in-part of application No. 16/212,663, filed on Dec. 6, 2018, now Pat. No. 11,052,385, and a continuation-in-part of application No. 16/147,536, filed on Sep. 28, 2018, now abandoned.

(60) Provisional application No. 63/139,145, filed on Jan. 19, 2021, provisional application No. 63/036,651, filed on Jun. 9, 2020, provisional application No. 62/883,286, filed on Aug. 6, 2019, provisional application No. 62/760,428, filed on Nov. 13, 2018, provisional application No. 62/595,261, filed on Dec. 6, 2017, provisional application No. 62/564,408, filed on Sep. 28, 2017.

(51) Int. Cl.
*B01J 21/10* (2006.01)
*B01J 23/02* (2006.01)
*B01J 23/06* (2006.01)
*B01J 23/10* (2006.01)
*B01J 23/72* (2006.01)
*B01J 23/745* (2006.01)
*B01J 23/78* (2006.01)
*B01J 23/80* (2006.01)
*B01J 23/83* (2006.01)
*B01J 35/00* (2006.01)
*C02F 1/72* (2023.01)
*C02F 101/32* (2006.01)

(58) Field of Classification Search
CPC ... B01J 23/02; B01J 23/06; B01J 23/10; B01J 23/72; B01J 23/745; B01J 23/78; B01J 23/80; B01J 23/83; B01J 35/0004; C02F 1/725
USPC .............................. 502/302, 346, 349–351
See application file for complete search history.

(56) References Cited

U.S. PATENT DOCUMENTS

| | | | | |
|---|---|---|---|---|
| 5,753,106 | A * | 5/1998 | Schenck | C02F 1/325 250/432 R |
| 6,136,186 | A * | 10/2000 | Gonzalez-Martin | B01J 35/002 210/201 |
| 6,409,928 | B1 * | 6/2002 | Gonzalez | B01D 53/864 210/759 |
| 6,752,957 | B1 * | 6/2004 | De Lasa | B01D 53/007 422/186.3 |
| 6,887,816 | B2 * | 5/2005 | Tanaka | B01J 21/063 502/340 |
| 6,902,653 | B2 * | 6/2005 | Carmignani | C02F 1/725 422/186 |
| 7,473,481 | B2 * | 1/2009 | MacPhee | H01M 8/1009 429/111 |
| 8,628,726 | B2 * | 1/2014 | Pham-Huu | B01J 37/084 422/186.3 |
| 2005/0044847 | A1 * | 3/2005 | Twigg | B01D 53/9454 60/299 |
| 2005/0163673 | A1 * | 7/2005 | Johnson | B01J 35/004 422/139 |
| 2010/0239470 | A1 * | 9/2010 | Pham-Huu | B01J 37/084 422/186 |
| 2013/0168228 | A1 * | 7/2013 | Ozin | C25B 3/25 977/773 |
| 2017/0007955 | A1 * | 1/2017 | Henshaw | B01D 53/8668 |

* cited by examiner

COMBINED VOC MITIGATING AND ANTIMICROBIAL SYSTEMS

CROSS REFERENCE TO RELATED APPLICATIONS

The following patent applications are incorporated in their entirety: Photocatalytic Fluid Purification Systems, U.S. Provisional Patent Application 62/564,408, filed Sep. 28, 2017; Photocatalytic Surface Systems, U.S. Provisional Patent Application 62/595,261, filed Dec. 6, 2017; Photocatalytic Fluid Purification Systems, U.S. patent application Ser. No. 16/147,536, filed Sep. 27, 2019, Monolithic Composite Photocatalysts, U.S. Provisional Patent Application 62/760,428, filed Nov. 13, 2018; Photocatalytic Surface Systems, U.S. patent application Ser. No. 16/212,663, filed Dec. 6, 2018, Photocatalytic Fluidized Bed Reactor Systems, U.S. Provisional Patent Application 62/883,286, filed Aug. 6, 2019; Monolithic Composite Photocatalysts, U.S. patent application Ser. No. 16/680,495, filed Nov. 12, 2019; Antimicrobial Surface Systems, U.S. Provisional Patent Application 63/036,651, filed Jun. 9, 2020; Photocatalytic Fluidized Bed Reactor Systems, U.S. patent application Ser. No. 16/987,386, filed Aug. 6, 2020, Antimicrobial Surface Systems, U.S. patent application Ser. No. 17/343,723, filed Jun. 9, 2021; Monolithic Composite Photocatalysts, U.S. patent application Ser. No. 17/481,279, filed Sep. 21, 2021 and Combined VOC Mitigating and Antimicrobial Systems, U.S. Provisional Patent Application 63/139,145, filed Jan. 19, 2021.

FIELD OF THE INVENTION

The present invention relates to novel fluid purification devices that employ photocatalytic reactors and that may be combined with antimicrobial or antiviral functionality, either via the photocatalytic effect or with other complementary methods. It also relates to photocatalytic fluid purification devices for high flow rate process streams and methods to prevent release of hazardous incompletely mineralized chemical compounds.

BACKGROUND

This invention was made with government support under contracts from the National Science Foundation, NSF Award #1927003, and US Department of Agriculture, USDA Award #2018-33610-28231. The government has certain rights in the invention.

There is a need for improved air purification systems that remove volatile organic compounds (VOCs), pathogens, e.g., bacteria, viruses, molds, spores, and other airborne contaminants from indoor or closed environments. Indoor environments include buildings of all kinds, as well as enclosed spaces used in transportation, for example, aircraft, trains, buses, and automobiles. Numerous systems exist, yet all have deficiencies. Systems may comprise filters, e.g., high performance particle air (HEPA), adsorbents or sorbents, e.g., activated charcoal, and photocatalytic systems. HEPA filters remove particulates, including microbes and viruses, but not VOCs. In the dry air of an aircraft cabin, for example, trapped bacteria may become disabled on the surface of the HEPA filter, and thus not pose a risk to persons changing the filters or disposing them. In contrast, viruses may remain viable, and thus represent a hazard to those subsequently handling the filters. Sudden changes in pressure or other external forces may dislodge the pathogens, releasing them into the enclosed space where they become a hazard for occupants. Activated charcoal can remove VOCs, but efficiency and effectiveness diminish at low concentrations, which may still be above a threshold considered hazardous to humans. Further, adsorbents are ineffective at disabling bacteria and viruses. Combinations of HEPA and activated charcoal can are often used, but maintain similar drawbacks. Photocatalysts can remove both VOCs and disable microbial pathogens, but hazardous by-products can be released if conversion is not complete. For example, formaldehyde, which is hazardous to humans, is formed as one of several intermediates during the mineralization of alcohols. Formaldehyde that desorbs from the photocatalyst before complete mineralization to $CO_2$ and water may pose a hazard to the immediate environment at higher concentrations. The EPA has set a recommended threshold of 16 parts per billion (ppb) for a time weighted exposure level over 8 hours.

The following are a set of desirable attributes of any air purification system, particularly those containing a photocatalytic component:

Ability to remove the chemical contaminants present in the air, e.g., toluene, acetone, alcohols, formaldehyde, and chlorinated contaminants, Avoid release of potentially harmful intermediates, Ability to meet flow/turnover requirements, Ability to disable viruses.

Regeneration of active surfaces of the photocatalyst

Photocatalysis is a process that uses light to create electrons and holes in a semiconductor ("photocatalyst"), which then interact with surface groups to form reactive oxygen species (ROS), such as $OH^-$ and $O_2^-$. These ROS can be used to transform or degrade organic species, eventually producing $CO_2$ and $H_2O$ in a process called mineralization if reactions proceed to completion. This process may be used for fluid purification, where a fluid can include one or more gases or one or more liquids or a combination thereof, such as a mist or foam. Alternatively, ROS are used in the reaction of organic species to create high-value products. Photocatalysis is used to transform $CO_2$ to methanol or methane.

Photocatalytic reactions require efficient mass transfer of the chemical species to be transformed, often organic, to and from the active sites of the photocatalyst and optimal light utilization to ensure the photoactive sites are sufficiently reactive to convert the chemical species. To achieve optimal performance, both the photocatalyst and the reactor should be matched, i.e., designed as a system, such that mass transfer and light utilization are maximized within the system. A variety of reactor systems have been developed, including annular, fixed bed, monolithic, and flat plate where the photocatalyst is stationary within the reactor and the fluid passes over the active phase.

A fluidized bed design is one method to engineer the necessary spacing between active catalyst particles within the reactor system to allow suitable light penetration and utilization. The design also allows the use of small particles, increasing external mass transfer without the large pressure drop penalty of filters or packed bed designs. Compared to a HEPA filter, which has excellent viral and bacterial filtering capabilities, the fluidized bed envisioned in this patent would incur $1/5^{th}$ to $1/10^{th}$ of the pressure drop. This is important for direct energy savings in the form of air delivery cost, but also in the ability to retrofit existing ducting with virucidal and VOC removal capabilities. Many existing office, home and school HVAC systems cannot accommodate an additional pressure burden without prohibitive renovations to the entire HVAC system.

The subject invention may be embodied in the following examples that are by no means restrictive but are intended to illustrate the invention. It will be clear that the described invention is well adapted to address the issues described above, as well as those inherent within. The citation of any publication is for its disclosure prior to the filing date and should not be construed as an admission that the present invention is not entitled to antedate such publication by virtue of prior invention. Numerous other changes may be made which will readily suggest themselves to those skilled in the art and which are encompassed both in the spirit of the disclosure above and the appended claims.

SUMMARY OF THE INVENTION

In one aspect, the invention relates to a photoreactor that has a bypass that allows the reactor bed or photocatalytic media to run under optimal conditions.

In another aspect, the invention relates to sensors that can be used as part of the system to regulate operation of the photoreactor.

In a further aspect, the invention relates to regeneration of the photocatalyst media using various means or using the purified air from another photoreactor which may be operated in parallel and further in communication with the first photoreactor.

In another aspect, the invention relates to a photoreactor containing fluidizable media that are photocatalytically active having properties that abate airborne pathogens and VOCs.

In another aspect, the invention relates to fluidizable media that are photocatalytically active and fluidizable media that are not photocatalytically active having properties that attract airborne pathogens and that distribute light inside the reactor that can be used in conjunction with photocatalytic media in the same reactor or in a series of reactors, one containing the non-photocatalytically active fluidizable media and the other the fluidizable photocatalyst.

In yet another aspect, the invention relates to the integration of the photoreactor system into a larger air handling system where all or a portion of the air flow through the air handling system may be directed through the photoreactor system.

DETAILED DESCRIPTION OF THE INVENTION, AND PREFERRED EMBODIMENTS THEREOF

The present disclosure relates to a photocatalytic fluidized, moving bed or fixed bed reactor system ("photoreactor") that utilizes a monolithic composite photocatalyst for efficiently integrating light into the photocatalyst and throughout the cross section of the reactor. Monolithic Composite Photocatalysts are described in "Monolithic composite photocatalysts," U.S. patent application Ser. No. 16/680,495 filed Nov. 12, 2019, which is incorporated in its entirety.

The monolithic composite photocatalyst of the present disclosure may have characteristics comprising those shown below:
  a. greater than 90% small, discrete photoactive nanocrystals or photoactive nanocrystal aggregates with size less than or equal to 5 nm;
  b. Monolithic composite photocatalyst $N_2$ BET surface area in the range 10-900 $m^2/g$, preferably 20-800 $m^2/g$, and most preferably 90-600 $m^2/g$;
  c. Mesopores of the monolithic composite photocatalyst in the range 2-50 nm, preferably 4-45 nm, and most preferably 6-40 nm.
  d. Photoactive nanocrystal loading 1-25% by mass, preferably 5-22%, most preferably 10-20%.

It will be understood that all references to photocatalysts in this invention refer to monolithic composite photocatalysts.

As used herein and in the appended claims, the illumination source refers to any apparatus that emits light of the wavelength necessary to activate the photocatalyst. The light source or sources may include but are not limited to: light-emitting diodes (LEDs), laser diodes, low or medium pressure mercury lamps, Xe-discharge lamps, and excimer lasers. Illumination sources may optionally provide light that has utility to regenerate the photocatalyst, e.g. UVC radiation, and/or to heat the photocatalyst in order to regenerate the photocatalyst or to increase chemical transformation rates.

As used herein and in the appended claims, fluidizable or fluidizable photocatalyst refers to a solid within a fluid flow whose downward force due to gravity is overcome by the drag force applied by an upward flowing fluid causing the solid to move.

As used herein and in the appended claims, a fluidized bed refers to a system where the photocatalyst inside the reaction zone is mobilized by the fluid passing through the photocatalyst or by an external agitator such as vibration or rotation.

As used herein non-imaging optics refers to an ensemble of transmissive, scattering or reflective optical elements and materials that maximize the fraction of illumination that is incident on the photocatalyst and the uniformity of such illumination. In a preferred embodiment, the photocatalyst bed is itself an element in the photoreactor non-imaging optical system and properties of photocatalyst diffuse reflectance (i.e., scatter) and absorption are tailored to optimize performance. Other particles that do not contain the photocatalyst but are contained in the reactor and are transparent or reflective can also be part of the optical system whose concentration, size, transparency, and reflectivity can be tailored to optimize performance. Other surfaces of the containment vessel may possess high external transmittance via the use of antireflection coatings. These highly reflective or transmissive surface coatings may be comprised of high hardness materials that reduce the abrasion due to the fluidized photocatalyst during use.

As used herein and in the appended claims, the attrition is a measure of the particle size or mass reduction of the monolithic composite photocatalyst when subjected to the test method described by ASTM D5757, "Standard Test Method for Determination of Attrition of FCC Catalysts by Air Jets." Briefly, air of a known flow rate is passed through an orifice plate. The monolithic composite photocatalyst particles interact with the air stream and other monolithic composite photocatalyst particles. Collected fines are weighted periodically to determine the attrition rate (wt %/h).

In embodiments that incorporate fluidized or moving bed designs, the disclosure also relates to photoreactor design principles that are described in the referenced patent application documents, including the use of low-attrition photocatalysts that fluidize efficiently under operating conditions and reactor designs that utilize transmissive or reflective surfaces to improve the illumination and light interaction with the photocatalytic species, which directly increases desired mineralization of chemical species. It also relates to regeneration operational schemes and hardware to increase photocatalyst lifetime and extend operation between shutdown cycles. It also relates to fixed bed reactors that incorporate a membrane or other physical scaffold that is functionalized with monolithic composite photocatalyst particles as described in "Monolithic Composite Photocatalysts," U.S. patent application Ser. No. 17/481,279, filed Sep. 21, 2021, which is incorporated in its entirety.

The invention also relates to reactors that are vibration and acceleration tolerant. Air and space vehicles are designed to flex to absorb energy and prevent catastrophic fracture failure. It follows that systems designed for these vehicles cannot be rigid and must flex along with the airframe to avoid subsystem failure. In one embodiment, a photoreactor can be coupled to the air handling system through flexible couplings or flexible tubing and a rigid photoreactor body. The couplings will allow the entire system to move with the airframe during deflections but maintain a rigid light reactor setup to preserve optical alignment of the source and any reflectors. In another embodiment the photoreactor can be constructed out of flexible UV transparent material or have built in flexion points that bend with the vehicle with enough tolerance that the illumination source maintains uniform illumination under flexion.

In another aspect, the photocatalytic reactor system (FIG. 1) comprises a slipstream capability wherein a portion of the input gas is directed through a bypass 1001 around the reaction zone 1002 that is illuminated by light sources 1003. The portion of input gas diverted from the reaction zone may range from 0-100%. One or more valves are used to control the amount of bypass. A bypass valve 1004 may be used alone or in conjunction with a valve 1005 that controls flow to the reaction chamber from the inlet 1006. The objective for diversion of flow through a bypass is to keep the photoreactor operating at a high level of conversion of the target gas species. The level of conversion may be expressed as a conversion efficiency, which is defined as the concentration of a particular specie or species at the inlet of the photoreactor minus the concentration at the outlet divided by the concentration at the inlet, expressed as a percentage.

Figure 1:
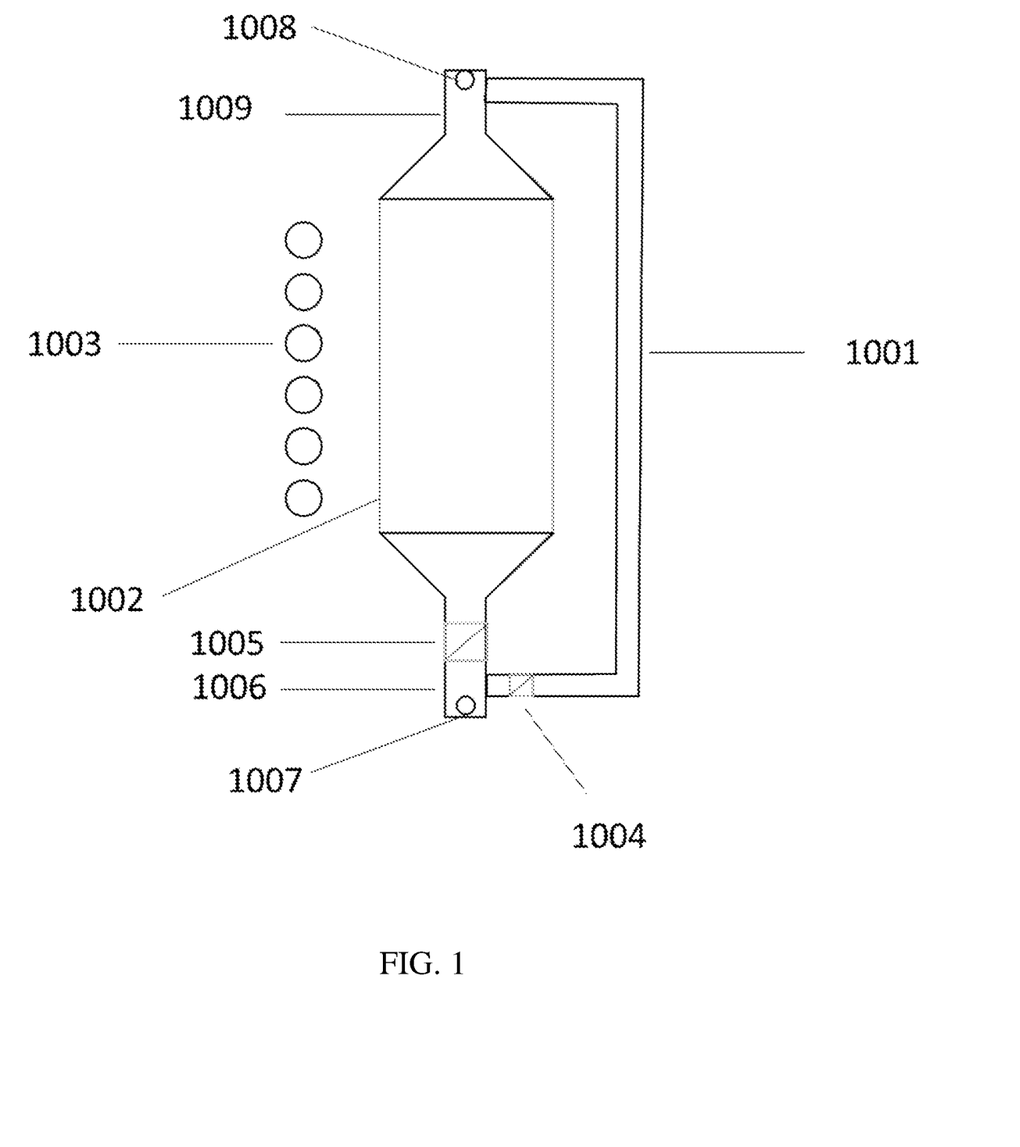
FIG. 1 shows a schematic of a photoreactor with a bypass optionally operated in feedback from sensors that monitor performance.

The valves may be controlled in a closed loop mode or in an open loop mode. Closed loop control mode denotes use of input data from an upstream sensor 1007 located in the inlet 1006 or downstream sensor 1008 located in the outlet 1009. These sensors may indicate presence of gases or gas concentrations that may either degrade the photocatalyst or produce undesirable byproducts or intermediates if their throughput (mol/hr) becomes too high in the input gas. In the case of the upstream sensor, a throughput range may be specified such that when the amount of an input gas per unit time becomes too high, a portion of the gas is directed to the bypass to avoid undesirable reaction conditions in the catalyst bed by increasing the residence time of the non-bypassed gas in the photoreactor. Alternatively, makeup air that does not contain the gas or gases to be purified can be added to the photoreactor through a separate valve to maintain a target flow rate through the reactor. The action of the bypass may be proportionally controlled such that there is a proportional relationship between the input gas throughput and the flow of gas directed to the bypass. This control may be accomplished by electronically controlled valves 1004 and/or 1005. In the case of the downstream sensor, the detection of an undesirable byproduct can be used to modulate the amount of gas flowing through the reaction zone and the amount of input gas flowing through the bypass. Undesirable byproducts include, but are not limited to formaldehyde, benzene, and acetaldehyde.

In another embodiment, gas concentration sensors such as photoionization detectors (PIDs) may be configured both upstream and downstream of the photocatalytic reactor. The output signals may be compared, and the calculated ratio of the gas concentrations will represent the reactor conversion efficiency. This conversion efficiency may be monitored and used as feedback to control system operating parameters such as photocatalytic illumination intensity, the amount of bypass or other control input variables.

Open loop control mode denotes operation of subject control valves 1004 and/or 1005 based on logical signals that are external to the photoreactor and subject sensors. These signals may be based on pre-programmed schedules with the intent to conserve energy, allow photoreactor regeneration, or other maintenance related objectives. They may also be based on input signals that originate from sensors outside the photoreactor system, such as facility temperature or humidity levels.

Suitable gas concentration sensors include optical sensors, electrochemical sensors, and solid-state sensors with acceptable selectivity for the target gas. The most relevant optical sensors include but are not limited to modular photoionization detectors (PID), flame ionization detectors (FID) and cavity ring down spectroscopy (CRDS).

Under some system operating conditions, the monolithic composite photocatalyst may transitively accumulate chemical reaction by-products, which may cause a change in the catalyst optical properties (i.e. UV, visible, or IR adsorption). Such changes in the optical properties of the catalyst may be quantitatively determined using a colorimetric sensor, and the resulting signal used as an indicator of incomplete reaction. In a preferred embodiment a colorimetric sensor is in a diffuse reflective geometry. It is comprised of a light source such as a blue LED at 450-460 nm emission wavelength, with light incident on the downstream portion of the photocatalyst fluidized bed. The emission wavelength of the colorimeter may be selected based on the by-product optical absorbance properties that are of interest. Diffusely reflected light is detected near the LED source, and the diffuse reflectance is determined. A preferred embodiment utilizes a silicon PIN-diode detector that is integrated with an LED illumination source in a single electronic package. Electronic processing functions may optionally be incorporated in such a LED/detector package.

Colorimetric measurements may be challenging due to the very high photocatalytic illumination intensity in the subject photoreactor. Several noise reduction methods are needed to discriminate the colorimetric illumination signal and may be used advantageously. These include an optical bandpass filter on the detector, which may be implemented on a UVA absorbing glass. UVA is defined as light with wavelengths in the range of 320-400 nm. Transmittance of this filter assembly should preferably be less than $10^{-6}$, i.e. less than 0.0001% at the range of photocatalytic illumination wavelengths, such as 365 nm or 385 nm. A heterodyne detection approach also has high utility to reject photocatalytic illumination and possible photoluminescence that may overlap the colorimetric wavelength operating range. This noise reduction method is complementary to the bandpass filter and is implemented by electrically "chopping" the colorimetric source at a known low frequency such as the kHz range. The colorimetric intensity thus may have a square wave or other temporal profile, and the detection electronics are configured to be sensitive to that incident light with that temporal profile. The combined optical bandpass and heterodyne methods are an effective approach to achieve adequate signal-to-noise ratios in the extremely optically noisy photoreactor environment.

Figure 2:
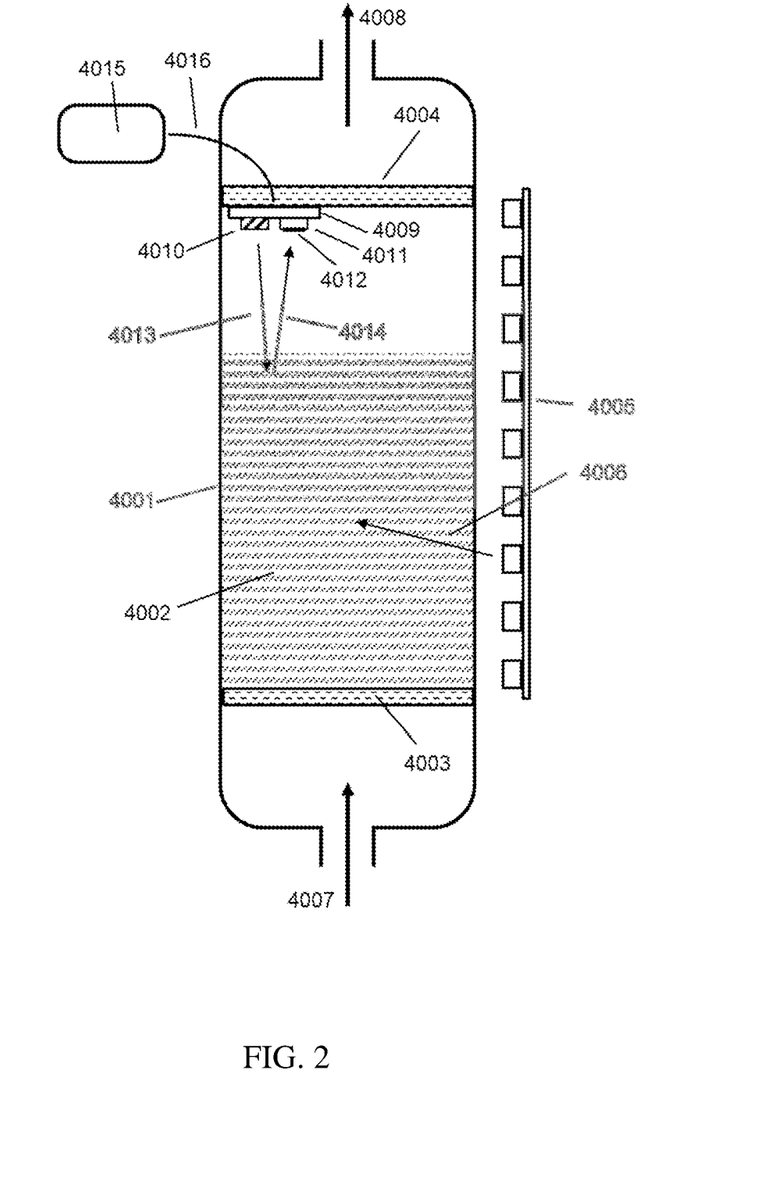
FIG. 2 shows a schematic of a colorimetric sensor that can be used to control the photoreactor system.

FIG. 2 shows a photocatalytic fluidized bed reactor schematic with a colorimetric sensor integrated in a diffuse reflectance configuration. The reactor vessel 2001 is constructed from fused silica glass and contains a catalyst 2002 that is internally confined with gas permeable screens upstream 2003 and downstream 2004. A UV LED array 2005 is configured adjacent to the vessel and the catalyst is illuminated with UVA light 2006. Gas to be purified enters the upstream inlet at the bottom of the reactor 2007 and exits at the top of the reactor 2008. The catalyst bed is thus fluidized. A colorimetric sensor 2009 is configured downstream of the fluidized bed and comprises an LED light source 2010 and a silicon PIN detector 2011. An optical bandpass filter 2012, with its pass band at the LED emission wavelength bands, is positioned on the detector window to exclude extraneous wavelengths including possible photoluminescence from the illuminated photocatalyst. The colorimeter emits a probe beam 2013 and senses a diffusely reflected signal beam 2014. The colorimetric sensor power and data connections are provided by a sensor control module 2015, via a cable 2016. The colorimetric data is used for system diagnostics or for closed loop control as discussed herein.

The colorimeter may also be configured in a transmissive geometry, with the sensor and detector disposed on opposite sides of the catalyst bed or assembly holding the catalyst.

In another aspect of the invention, the subject photocatalytic reactor is employed as a subsystem for an air handling system and is configured in parallel to an air handling system. All or part of the overall system flow may be diverted to the photocatalytic system where trace VOCs and pathogens are reduced accordingly. The air handling system may handle typical duties such as particulate filtration, heating or cooling, or may add components such as water to target a specific humidity level to meet downstream requirements. A photocatalytic reactor may treat all or a fraction of the total flow while maintaining a certain conversion efficiency. For a gas traversing the system once, this is known as single pass efficiency. Conversion is defined as the inlet concentration of a specie or species minus the outlet concentration of the specie or species divided by the inlet concentration of a specie or species. A conversion efficiency of 50% is desirable, 75% is more desirable, and 90% single pass conversion is most desirable. The effluent of the combined system would function as if it had a single pass conversion equal to the fraction of total flow through the photocatalytic reactor. In a variation of fixed fractional diversion, the fraction of total flow that is diverted is varied, based on desired total conversion or flow rate. Total flow rate is measured by any number of commercial devices. A ducting system may utilize a hotwire anemometer for continuous, low disturbance flow data.

In addition to flow rate modulation based on sensor feedback, radiation intensity (or illumination intensity) may also be altered. Variation of light intensity will allow the device to operate in a power saving or even standby mode decreasing or ceasing energy consumption from the light source (e.g., LEDs) based on feedback from the sensors. The light intensity may also be increased to better adapt to a surge in contaminants to prevent contaminant breakthrough. Light intensity ranges from a high of 60 W/(ft$^3$/min) down to 0.05 W/(ft$^3$/min) may be used, more preferably 0.2 W/(ft$^3$/min) to 10 W/(ft$^3$/min). Dynamic and reactive light power will decrease overall power consumption and increase LED lifetime. The range of light intensity possible is continuous and thus can be controlled continuously in a closed loop configuration. The algorithmic control will accept input from a sensor and output required light intensity. In addition to a sensor, the light intensity could also be controlled by a user or set by predetermined time. A use case would include a user increasing the light level when people or gas concentration exceeding a desired level are present in a room or a timed increase when an office building is occupied, lowering the light level when most workers have left. For example, in an office building lighting could be increased to 2 W/(ft$^3$/min) between 7 AM and 7 PM then lowered to 0.2 W/(ft$^3$/min) the remainder of the day.

Figure 3:
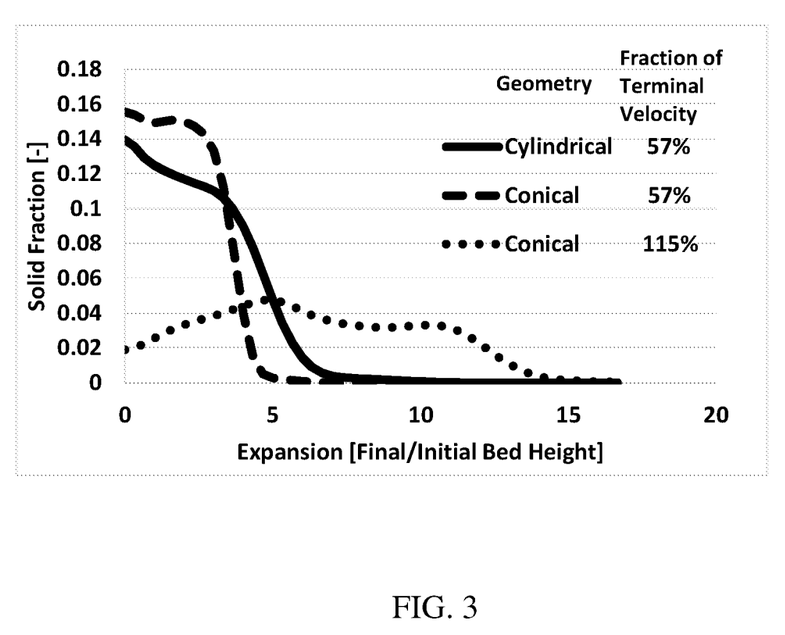
FIG. 3 shows the solid fraction of a fluidized bed as a function of different geometries.

Turning now to other details of the photoreactor operation, optimal fluidization within the photoreactor is characterized by the uniformity of mixing between gas and photocatalyst particle and degree of expansion of the particle envelope of the catalyst bed. Bed expansion is the multiple of the initial bed volume the particles spread as they are fluidized. For instance, at zero flow a catalyst bed may have a depth of 1 cm, but at a 1 m/s gas flow velocity, it may expand to 10 cm. Such a bed would have a bed expansion of 10. The extent of bed expansion is positively correlated to flow velocity. The terminal velocity is the velocity at which the particles become entrained in the gas flow. The ratio of the flow velocity to terminal velocity is a key parameter. Controlling bed expansion such that particles do not become entrained is possible by altering the geometry of the reactor. The simplest geometry is a cone shaped reactor. It will allow a range of gas velocities to be produced regardless of the inlet gas flow rate by elevating the average location of the fluidized bed to a larger cross-sectional area. As the conical reactor cross-sectional area increases with height, the flow velocity decreases. Thus, a high flow rate or low flow rate will contain the particles. FIG. 3 shows the distribution of solid particles as simulated at 57% and 115% of the terminal velocity. In this example, the conical reactor cross-sectional dimension only slightly expands at an angle of 4° along its length. A cylindrical reactor disperses the catalyst more than the conical reactor at a similar velocity. Advantageously, a conical reactor is able to achieve 115% of the terminal velocity without entraining catalyst particles. This increases the usable flow range of the device. Angles of expansion range between 1° to 20° with most preferably between 1° and 10°. The chosen angle is determined by the velocity range of the flowing gas. Uniformity of mixing qualifies the presence of channeling or dead zones where either process gas passes through a particular path through the bed in surplus or in deficit of the average value. Uniformity is primarily controlled by uniform gas distribution over the inlet of the reactor and minimizing the size of bubbles as the gas traverses the reactor.

The invention also relates to VOC-mitigating photocatalytic reactors that incorporate antimicrobial efficacy, i.e., that have efficacy to kill various pathogens, including bacteria and fungi and to disable viruses in addition to its function to mineralize trace VOCs and other organic gas and vapor contaminants. Antimicrobial efficacy includes the ability to kill bacterial or fungal spores or disable viruses and may be either "real-time", i.e., with active microbial load continuously decreased in the gas stream during reactor operation, or occur in a regeneration mode. Regeneration denotes the collection of viable microbes during operation, with periodic killing or disabling at specific times when the system is idling or not otherwise in use.

There are several novel ways to achieve real time antimicrobial efficacy. The monolithic composite photocatalyst has been shown to disable pathogens in direct contact due to its generation of ROS. Photocatalytic efficacy of the monolithic composite photocatalyst has been demonstrated for gram+ and gram- bacteria, enveloped viruses including MS2 and coronavirus, and bacterial spores such as *bacillus subtillis*. Photocatalytic illumination wavelengths of 405 nm and 365 nm have been used and are especially useful for activating monolithic composite photocatalysts in moving and fixed bed reactors as an approach to engineering the optical penetration depth in the photocatalyst bed. Fluidized beds are particularly useful for this purpose, as the bed void fraction can be controlled to further engineer optical penetration depth in the bed. The optical light adsorbed is proportional to the catalyst mass density in a local volume. Increasing bed void fraction increases the mean free path which increases penetration depth of the light on a volume basis. Fluidization also allows for a rapid exchange of photocatalyst particles through reactor regions with non-uniform optical intensity.

Photocatalyst bead diameter is another variable that can be tuned to optimize antimicrobial activity. For VOC mitigation, the target vapor species are adsorbed and then mineralized throughout a monolithic composite photocatalyst particle, with typical diameter from 20-700 µm. In contrast, antimicrobial efficacy utilizes predominantly the exterior surface of the monolithic composite photocatalyst particle because bacteria, viruses, and fungal spores are too large to effectively adsorb in the pores of the monolithic composite photocatalyst. Without wishing to be bound by theory, smaller monolithic composite photocatalyst particles may be more efficacious because the available external surface area is increased for a given photocatalyst mass in a bed. A preferred embodiment for VOC mitigation incorporates a fluidized bed of 20-400 µm diameter monolithic composite photocatalyst.

UVC illumination (190-280 nm spectral region), incident on the photocatalytic reactor moving or fixed bed, optionally provides additional antimicrobial efficacy that complements the photocatalytic effect that may be stimulated by longer wavelengths such as 365 nm-420 nm spectral region. Such short wavelength irradiation (190-280 nm) may effectively disable pathogens both on the surface of the monolithic composite photocatalyst and in the gaseous volume for aerosolized pathogens.

A range of UVC wavelengths are effective to disable viruses, bacteria and bacterial spores. Longer wavelengths such as 266 nm (generated via LED sources) and 254 nm (low, medium or high pressure mercury discharge lamps) are generally effective to disable a range of pathogens, while 222 nm (generated by an excimer discharge source) have increased efficacy to disable bacterial spores such as *C. difficile* and anthrax. Operation of a photocatalytic system with such UVC enhancement may utilize simultaneous illumination with UVA (e.g., 365 nm) and UVC (e.g., 222 nm) in the photoreactor.

In another aspect, to promote removal of the virus, bacteria, or spore species from the contaminated air stream, the surface of the monolithic composite photocatalyst may be modified to enhance surface adsorption of the microbe. For example, many bacteria and viruses carry a net negative surface charge near neutral pH. Monolithic composite photocatalyst with particle size in the 20-400 µm range modified to have a positive surface charge will attract the microbes present in the air stream through electrostatic forces. In one aspect, changes to the support and/or to the active photocatalytic material in the monolithic composite photocatalyst will result in a material with a higher isoelectric point, which can be exploited to enhance surface adsorption of viruses and bacteria. Materials with isoelectric points greater than pH 6 include, but are not limited to, zinc oxide, zirconium oxide, aluminum oxide, iron(III) oxide, copper(II) oxide, lanthanum (III) oxide, magnesium oxide, and mixtures thereof. When illuminated with UVA light, this monolithic composite photocatalyst may simultaneously mineralize VOCs, disable viruses, and kill bacteria, fungal spores, or bacteria spores adsorbed on its surface.

In a different embodiment, quaternary ammonium compounds can be tethered onto the external surface of the monolithic composite photocatalyst to generate a positively charged surface to attract the microbes. For example, quaternary ammonium silanes can be grafted onto the external surface of monolithic composite photocatalyst comprising titania on silica spheres. Positively charged surfaces will attract bacteria and viruses with a net negative charge. Once adhered to the surface, they remain captive until disabled photocatalytically with UVA light (365 nm to 405 nm) or UVC light (254 nm or 222 nm). UVC light can also directly disinfect the surfaces. Some quaternary ammonia silanes also show broadband antimicrobial activity on their own.

In another aspect, non-photocatalytic media modified to attract microbes (through, e.g., electrostatic interactions) may be intermixed with the monolithic composite photocatalyst in a photocatalytic reactor bed or used in series with the photocatalytic reactor bed. The non-photocatalytic media can be chosen to have a high isoelectric point (e.g., zinc oxide, zirconium oxide, aluminum oxide, iron(III) oxide, copper(II) oxide, lanthanum (III) oxide, magnesium oxide, and mixtures thereof) or modified with ligand to have a positive charge. In one embodiment, in a fluidized bed the monolithic composite photocatalyst as 20-400 µm spheres are mixed with silica spheres, nominally the same size, the surface of the silica spheres optionally having been modified with quaternary ammonium silanes.

In another embodiment the entire bed can be activated with UVC light to promote disinfection of pathogens on the non-photocatalytic media and UVA light to photocatalytically mineralize VOCs. The non-photocatalytic media can be a non-porous metal oxide with a high isoelectric point (e.g., zinc oxide, zirconium oxide, aluminum oxide, iron(III) oxide, copper (II) oxide lanthanum (III) oxide, magnesium oxide, and mixtures thereof). This reactor can be continuously illuminated with UVC light for example, to kill or disable the microbes captured on the surface of the non-photocatalytic media.

UVC radiation incident on a photoreactor with a bed of highly scattering materials, either photocatalytic or non-photocatalytic, will be much more effective than when incident on flowing process gas in the absence of the bed. Antimicrobial efficacy is enhanced in two ways. One is due to UVC incidence on immobilized pathogens on the catalyst surface. The other is due to increased interaction of the UVC light with gas phase species that are traveling through the reactor due to more uniform distribution of the light due to scattering.

The monolithic composite photocatalyst comprises non-photoactive porous support for photoactive nanocrystals. A non-photoactive porous support is a mesoporous catalyst carrier that does not generate electron-hole pairs when stimulated with UV or visible light. The support may be generally non absorbing, i.e. imaginary refractive index k less than 0.1 in the 250-280 nm. wavelength range.

These support materials have high optical scatter due to their pore structure and the myriad surface-air interfaces therein. For identical pore structure, higher refractive index supports display higher optical scatter. Hence optical scatter increases monotonically when going from silica (n=1.45) to alumina (n=1.70) to zirconia (n=2.0) to titania (n=2.4). This property allows efficient utilization of UV irradiation via optical scattering of the incident light to provide antimicrobial efficacy on these or non-photocatalytic media in a photocatalytic reactor. Such supports, either with active photocatalyst components or without, are particularly well suited to increase the antimicrobial effects of UVC irradiation to complement the photocatalytic effect.

Excimer discharge sources are also useful for this application since reliable and efficient high intensity UVC sources are now commercially available. Krypton chloride emits at 222 nm with additional broad emission bands to approximately 260 nm, unless these wavelengths longer than 222 nm are filtered out at the source. These excimer sources, AlGaN UVC LEDs and mercury discharge lamps (low, medium and high pressure) are all useful for this antimicrobial UVC irradiation approach.

Optionally, the non-photocatalytically provided antimicrobial efficacy may be provided intermittently, for example when the reactor is off-line from its normal functioning. In such cases viruses or other airborne pathogens may load onto elements in an air filtration system and remain active and hazardous for longer periods. It may be desirable to periodically regenerate the system using more aggressive methods than would be possible during normal air purification operation. Less aggressive methods include flowing purified air over the photocatalyst with simultaneous illumination of the photocatalyst. One example of more aggressive methods is introduction of vapor phase or aerosolized hydrogen peroxide in combination with UVC irradiation, employed as a means to accelerate virucidal or other biocidal functions of the system. Another more aggressive method is to flow ozone over the photocatalyst.

In another embodiment the purification system uses filter media made of low optically absorbing and high scattering material to allow the light to evenly penetrate the filter with sufficient intensity to deactivate the microbes. Over time adsorptive media and filters may become fouled with microbial, dust, and small molecule burden. It is advantageous to regenerate the media to enhance its lifetime. In one embodiment the biological burden on filters can be regenerated using high intensity UVA or UVC light, specifically 405 nm, 254 nm, and 222 nm light. Light of these wavelengths will destroy the microbes such as viruses, bacteria, and fungi. UVA light in the range 365 nm-405 nm can also be used to regenerate monolithic composite photocatalyst contaminated with microbes or small molecule burden. The light source can either be placed in series with the filters and used after a target amount of air has passed through the filter or located in an auxiliary system where the filters are placed and regenerated between uses. The UVC light sources may also help with the breakdown of organic molecules.

As described above, the monolithic composite photocatalyst can be regenerated from bioburden and VOCs using reactive oxygen species (ROS) such as $H_2O_2$ and ozone. $H_2O_2$ can be provided in nebulized form using an ultrasonic transducer, from an aqueous solution (0.1%-5% range), or more preferably in the 0.5-2% range. near the reactor or filter bed, or introduced upstream into an air stream from an auxiliary system. $H_2O_2$ vapor itself is an effective oxidizer for regeneration of the photocatalyst surface. Optionally, collection and absorption of the dilute hydrogen peroxide vapor or mist on the photoreactor media may be accompanied by UVC dissociation, which is an exceptionally effective method to generate reactive oxygen species (ROS). The resultant ROS effectively disables residual viable viruses that have survived and serves to mineralize residual non-volatile byproducts from the photocatalytic mineralization process.

Figure 4:
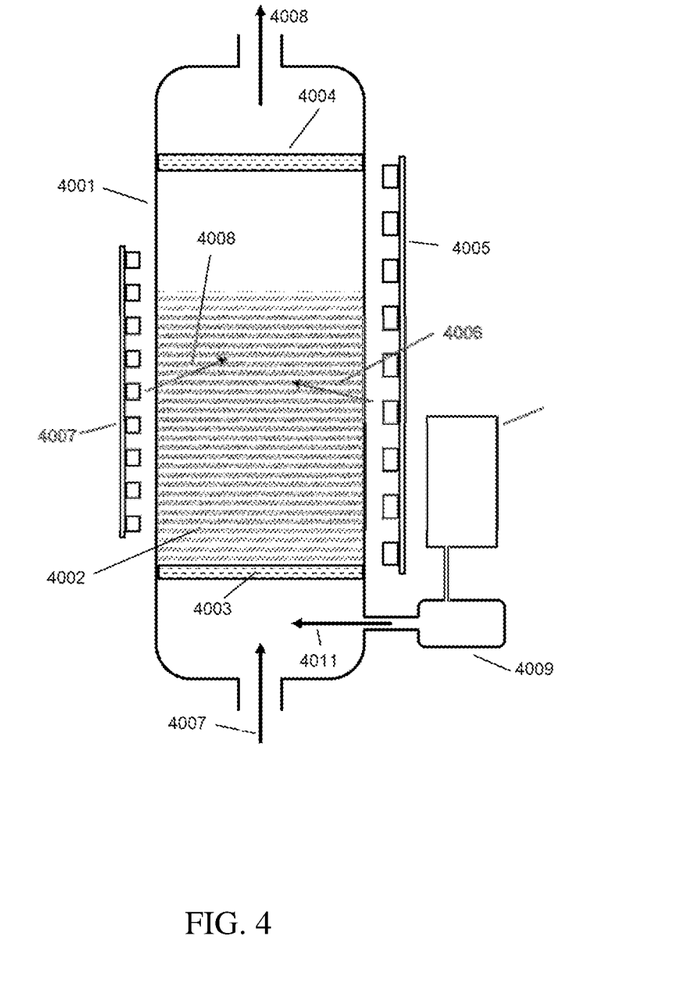
FIG. 4 shows a schematic of a photoreactor with regeneration components that can provide hydrogen peroxide mist, ozone, or combinations thereof into the photoreactor.

FIG. 4 shows a photocatalytic fluidized bed reactor schematic with a hydrogen peroxide injection apparatus configured upstream of the fluidized catalyst bed, and a UVC illumination source. The reactor vessel 4001 is constructed from fused silica glass and contains a catalyst 4002 that is internally confined with gas permeable screens upstream 4003 and downstream 4004. A UV LED array 4005 is configured adjacent to the vessel and the catalyst is illuminated with UVA light 4006. A second, complementary LED source 4007 emits UVC radiation 4008 onto the catalyst bed 4002. Gas to be purified enters the upstream inlet at the bottom of the reactor 4007, and exits at the top of the reactor 4008. The catalyst bed is thus fluidized. A hydrogen peroxide ($H_2O_2$) nebulizer 4009 is configured upstream of the fluidized bed, and aqueous $H_2O_2$ is supplied by a liquid reservoir 4010. Nebulized $H_2O_2$ is injected upstream of the fluidized bed 4011 and is conveyed into the bed via the inlet gas stream 4007. Thus UVC direct mitigation of aerosolized pathogens may be achieved, as a complement to the biocidal effects of the fluidized photocatalyst that is illuminated by UVA radiation. Introduction of nebulized $H_2O_2$, combined with UVC illumination, will enable accelerated killing of pathogens on the fluidized bed.

Ozone can be generated on demand and passed over the filter through an auxiliary system. Ideally the ozone so provided would be introduced when people are not present. System controls to ensure all ozone are destroyed after passing through the filter could make the system safe for use around people. The ozone may be introduced in a similar manner to that of $H_2O_2$ described in FIG. 4.

Photocatalytic media can also be regenerated to remove microbial, dust, and VOC contamination. It is advantageous to regenerate the media to enhance its lifetime. In one embodiment the biological and VOC burden on the photocatalyst can be removed using high intensity UVA or UVC light, light while flowing purified air through the photocatalyst bed. Coupled with a photocatalyst, these wavelengths will have enhanced killing power toward microbes and can help mineralize any adsorbed intermediates that poison the photocatalyst surface. Introduction of air and water to help promote the formation of reactive oxygen species on the photocatalyst during illumination can be used to enhance regeneration rates.

For mitigation of intermediates stored in the monolithic composite photocatalyst, VOCs and catalytic poisons that are adsorbed to the photocatalyst support and kinetically slow to mineralize, the photocatalyst can be subject to temperature and pressure changes desorbing the species in situ to regenerate the catalyst. For example, the catalyst can be heated above 100° C. or subject to vacuum or a combination of the two. For instance, sulfur compounds are a known catalyst poison and present in many industrial environments. The vast majority of sulfur compounds can be desorbed by heating up to 450° C. After continued sulfur exposure, the catalyst can be heated to desorb accumulated sulfur compounds. Heat can be added to the system with an inline electric heating device such as a nichrome wire or via a broadband high power light source, such as medium or high pressure discharge lamps. The contaminant rich effluent can then be routed to a sulfur adsorbent which may be in line with the photocatalytic reactor or present in a parallel stream.

Pressure swing desorption refers to adsorption of a species at a high pressure followed by desorption at a low pressure. In this case the compound to be desorbed is an intermediate, VOC or catalytic poison that is not readily mineralized photocatalytically or was adsorbed onto the catalyst at a high concentration in an excursion event. For instance, liquid hydrocarbons aerosolized in the challenge gas stream from an oil seal leak could be desorbed from the catalyst by lowering the pressure of the reactor vessel using a blower or pump. The otherwise sealed system will outgas the reactant through the pumping device to a suitable waste stream. The catalyst can tolerate extremely low pressures, so the pressure used would vary based on economics of pumping and contaminant of interest.

In another aspect of the invention, the composite photocatalyst/photoreactor system is designed to maximize complete VOC mineralization and minimize the formation of gas phase by-products. One approach for achieving enhanced performance is through two or more photocatalytic reactor beds in series. The reactor beds can be either fixed of fluidized type reactors or any combination thereof. These beds can contain monolithic composite photocatalysts tuned for optimum photocatalytic efficiency for different molecules. In one embodiment, two different monolithic composite photocatalysts may be used, each in a different fluidized bed photoreactor linked in series. For example in a dual gas stream containing gases A and B, a $TiO_2$-$SiO_2$ monolithic composite photocatalyst can be used to efficiently mineralize gas A. The air would then go to the second fluidized bed photoreactor downstream containing a different monolithic composite photocatalyst tuned for gas B and intermediates of gas A(e.g., a photoactive Pt-$TiO_2$ on a porous $Al_2O_3$). Alternatively, in a gas stream containing gas C, the first photoreactor can be tailored to efficiently mineralize gas C but creates a byproduct D. The second photoreactor in series can be tailored to efficiently mineralize D. In this case the downstream monolithic composite photocatalyst would be used as a polishing or finishing step to ensure complete mineralization of the components without release of incompletely oxidized by-products.

Figure 5:
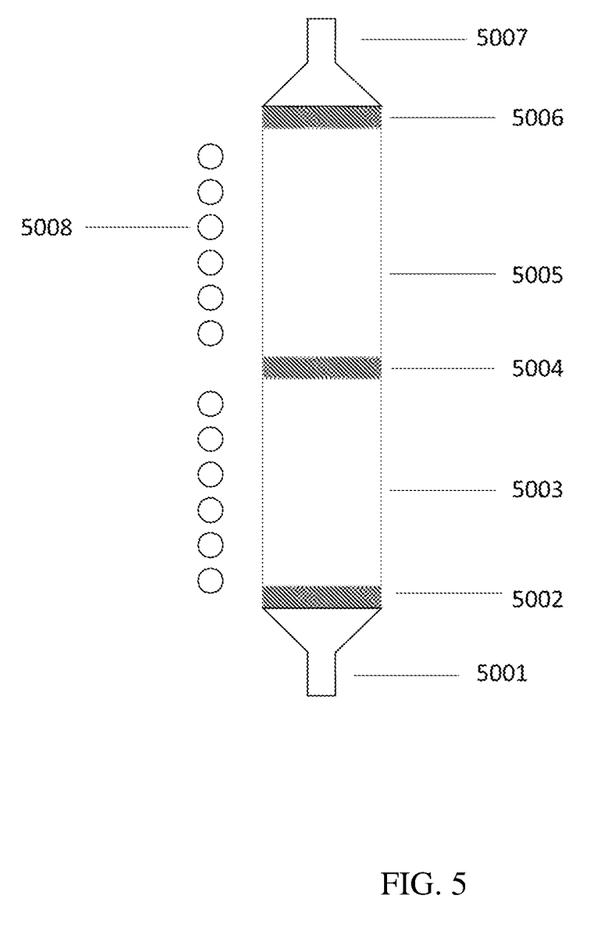
FIG. 5 shows a schematic of an air purification system with two separate reaction zones arranged in series.

A series configured multizone reactor is shown in FIG. 5. It comprises an inlet 5001, a first gas distribution element 5002, a first reaction zone 5003, a second diffusing element 5004, a second reaction zone 5005, a third gas distribution element 5006, and an outlet 5007. The reaction zones are illuminated by light sources 5008. Gas flows from the inlet 5001 through the gas distribution plates 5002, 5004, and 5006 and the reaction zones 5003 and 5005 to the outlet 5007. The system may optionally include various reflectors, as described in "Photocatalytic Fluidized Bed Reactor Systems," U.S. patent application Ser. No. 16/987,386, filed Aug. 6, 2020. In fluidization mode, the void fraction (i.e., volume not occupied by particles) can be adjusted by particle size, flow, and also may be controlled by the conductance of the distribution plates. In this way, the desired void fraction and particle size may be utilized for optimal conversion. The illumination wavelength may be different for the two reaction zones 5003 and 5005. A set of characteristics of the photocatalytic particles may be chosen for each reaction zone. In the case of a monolithic composite photocatalyst, this may be the support material, the pore size of the support, the pore volume of the support, and the identity of the photocatalyst supported thereon. The particle size may also be chosen independently of flow conditions and affixed to a rigid scaffold or support in one or more of the reaction zones. The scaffold may have a complex three-dimensional geometry to increase collisions of target species to be removed from the gas stream with the particles. The scaffold or support may be optically transparent to the illumination wavelength or it may be reflective or scatter the illumination throughout the reaction zone. Examples of optically transparent supports include silica, zirconia, alumina, and glasses. Examples of reflective materials include aluminum. The scaffold may be a porous material with pore sizes in the range from 1-1000 mm, preferably 2-10 mm. Optionally, additional gas may be introduced into one or more stages to control flow, pressure, and void fraction. This gas may come from different places in the control environment. For example, it may comprise air with lower levels of contamination from a specific location within a space to be purified or by bypassing some of the flow from the first reactor stage.

In one example of a multizone reactor, the first zone contains media optimized to remove bacteria, viruses and spores and the second zone contains media optimized to remove VOCs. The media in the first zone may comprise a monolithic composite photocatalyst wherein the porous support has a composition that results in positive surface charge to attract negatively charged bacteria, viruses and spores. Such compositions may include zinc oxide, zirconium oxide, aluminum oxide, iron(III) oxide, copper(II) oxide, lanthanum (III) oxide, magnesium oxide, and mixtures thereof The mixture may be contained within each support, i.e., as an alloy or multicomponent oxide or as a mixture of separate particles with different identities making up the bed through which the gas is flowed. The media in the second zone is a monolithic composite photocatalyst.

In another example of a multizone reactor, the media in first zone may be a non-porous material in the form of beads that has a composition with a positive surface charge that attracts negatively charged bacteria, viruses, and spores. Such compositions may include zinc oxide, zirconium oxide, aluminum oxide, iron(III) oxide, copper(II) oxide, lanthanum (III) oxide, magnesium oxide, and mixtures thereof. The mixture may be contained within each support, i.e., a multicomponent oxide or as separate particles making up the bed through which the gas is flowed. The media in the second zone is a monolithic composite photocatalyst. Subset with high scatter (aluminum oxide). Or silica for high scatter+low optical losses.

In either example, the diameter of the reactor may be the same or different. For example, if a denser media is used in one zone, then a smaller diameter of that zone may be used to increase velocity in that zone to optimize fluidization of the media. In either example, the media may be fluidized in one zone and stationary in the other. In the case of stationary media in a zone, the media may be supported on a scaffold.

Figure 6:
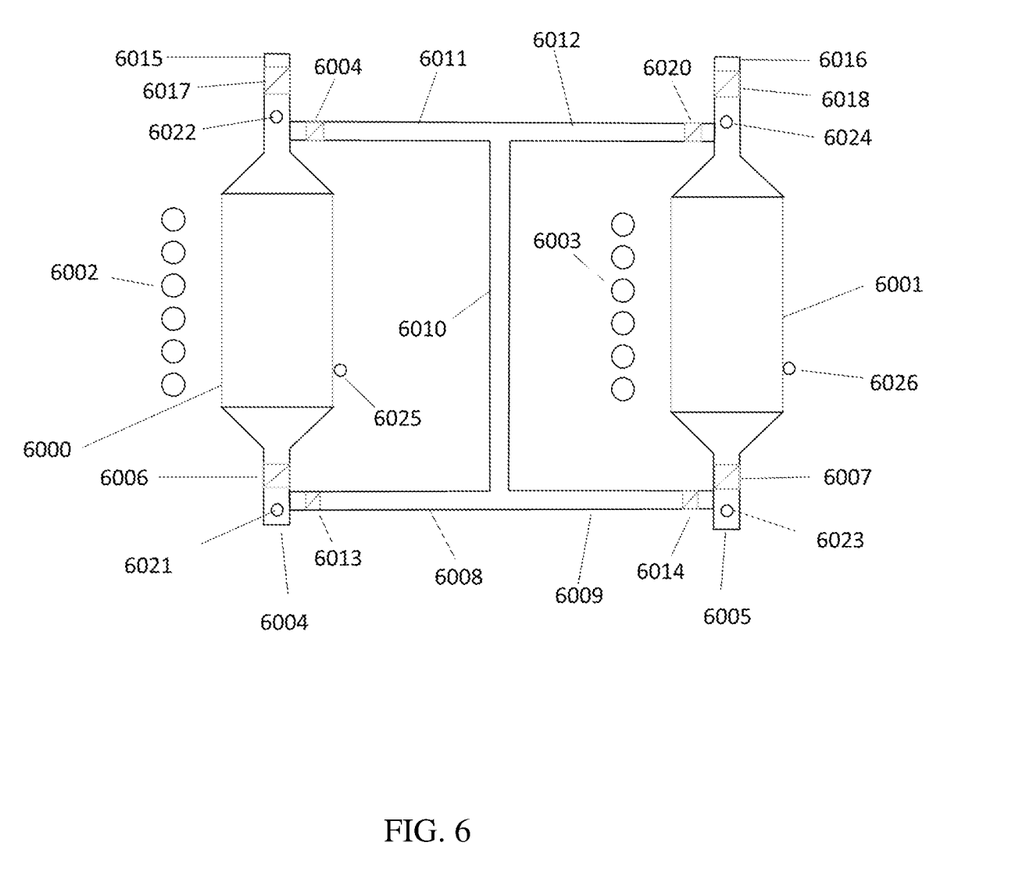
FIG. 6 shows a schematic of a photoreactor system comprising two photoreactors operating in parallel and configured to allow for regeneration of one of the photocatalytic beds.

In another embodiment, two or more photoreactors are operated in parallel with a connecting manifold that allows the output of one reactor to optionally flow into another reactor when desired, as for example to regenerate the photocatalyst. This configuration is depicted in FIG. 6, which shows to photoreactor chambers 6000 and 6001, each with illumination sources 6002 and 6003. The inlets 6004 and 6005 of each reactor contain valves 6006 and 6007 downstream of a portion of a bypass manifold that consists of 2 legs 6008, 6009, in communication with 3 other legs 6010, 6011, and 6012. The legs connected to the inlets 6004 and 6005 contain valves 6013 and 6014. Legs 6011 and 6012 connect with the outlets 6015 and 6016 of reactors 6000 and 6001 downstream of valves 6017 and 6018. Legs 6011 and 6012 contain valves 6020.

This design allows for efficient regeneration of one of the photocatalyst in one of the photoreactors by shutting off the flow to the inlet from outside the reactor system and directing the flow from the outlet of one reactor to the inlet of the other. The monolithic composite photocatalyst may be regenerated by flowing clean air through it while it is illuminated. As an example, the photocatalyst in photoreactor 6000 may be regenerated with purified air from photoreactor 6001 by the following valve orientations:

Valve 6006—open
Valve 6007—open
Valve 6013—open
Valve 6014—closed
Valve 6017—open
Valve 6018—closed
Valve 6109—closed
Valve 6020—open The photocatalyst in photoreactor 6001 may be regenerated with purified air from photoreactor 6000 in an analogous manner with the following valve orientations:

Valve 6006—open
Valve 6007—open
Valve 6013—closed
Valve 6014—open
Valve 6017—closed
Valve 6018—open
Valve 6109—open
Valve 6020—closed The advantage of this design is that the purified air from one reactor can be used to regenerate the other without the need for an external source of purified air. Thus, the first photoreactor 6000 can be used to regenerate the photocatalyst in the second photoreactor 6001 and vice versa. This sequence may be performed periodically at predetermined intervals or it may be performed in closed loop control with optional sensors.

In one embodiment of closed loop control, inlet sensor 6021 and outlet sensor 6022 may be used to monitor the performance of photoreactor 6000 by measuring the gas phase concentration of target species to be abated. If the conversion efficiency of one or more species thus measured falls below a certain threshold, a regeneration cycle can be initiated. Conversion efficiency is defined as the outlet concentration minus the inlet concentration divided by the inlet concentration, expressed as a percentage. Preferably, the regeneration cycle can be initiated when the conversion efficiency reaches 50%; more preferably, the regeneration cycle can be initiated when the conversion efficiency reaches 75%; most preferably, the regeneration cycle can be initiated when the conversion efficiency reaches 90%. Other setpoints of conversion efficiency may be selected. An analogous scheme can be used to regenerate photoreactor 6001 using inlet sensor 6023 and outlet sensor 6024.

In another embodiment of closed loop control a colorimetric sensor 6025 may be used to trigger a regeneration cycle of photoreactor 6000. In an analogous manner, colorimetric sensor 6026 may be used to trigger a regeneration cycle in photoreactor 6001. The colorimetric sensor, described earlier, detects color or transmissivity changes in the photocatalyst contained in the photoreactor, which can indicate degradation of photocatalyst performance. Photocatalyst performance can be regained by running a regeneration cycle with the purified air from the other photoreactor.

In an analogous manner, a single photoreactor connected to a multiplicity of photoreactors can be regenerated. In a reactor setup where there are 3 reactors, one reactor may be regenerated at any time. In a reactor setup where there are 4 or more reactors, two reactors may be regenerated at any time, and so on for larger numbers of similarly connect photoreactors.

Another benefit of parallel reactors is increasing the acceptable flow range of the reactor system. The performance of a fluidized bed reactor is greatly dependent on the void fraction of the catalyst within the reactor and thus the flow rate through the reactor. The increased dependence on flow rate narrows the flow range for reactor performance. Performance in this case could be light efficiency or overall conversion of the system. A parallel reactor concept allows reactors to be completely bypassed as overall flow is decreased while flow to the remaining active reactors is increased. The acceptable flow range is defined as falling between $1+\Delta r$ and $1-\Delta r$ where $\Delta r$ is ½ of the span of a single reactor. In a parallel reactor system with N reactors, $\Delta r > [N/(N-1)-1]/[N/(N-1)+1]$ to smoothly transition from utilizing N parallel reactors to N-1. For instance, in a system with 5 reactors $\Delta r$ must be greater than 0.11 to smoothly transition to only using 4 reactors, and $\Delta r$ must be greater than 0.33 to smoothly transition from 2 reactors to 1 reactor. The turndown ratio is a function of the number of reactors and $\Delta r$. Turndown ratio=$[(1+\Delta r)N_{max}]/[(1-\Delta r)N_{min}]$ with $N_{min}$ defined as the minimum number of acceptable reactors for preferably smooth but also discontinuous transitions. An overlap of flow between N and N-1 parallel reactors is also desired decreasing the usable range of $\Delta r$. The overlap removes dithering of the number of active reactors introducing a hysteresis. Typically values of $\Delta r$ are 0.2, but could be as high as 0.5 or as low as 0.05.

The fluidizable photocatalytic media and non-photocatalytic media described herein may also be affixed to scaffolds with desired geometric features to allow gas to flow through them and used within the systems described in a manner analogous to fluidizable media. All of the system concepts described herein may incorporate such a fixed, or non-fluidized bed, alone or together with fluidizable media as described in Monolithic Composite Photocatalysts, U.S. patent application Ser. No. 17/481,279 filed on Sep. 21, 2021, which is incorporated its entirety.

Optionally, different fixed, packed, or moving bed reactor designs can be used in the photoreactor system, creating different zones for, for example, VOC mitigation, antimicrobial activity, and monolithic composite photocatalyst regeneration. Photoreactors can also be used in conjunction with HEPA filters, ion exchange filters, and/or adsorbent filters to maximize VOC, bacteria, and virus removal. For example, a monolithic composite photocatalyst membrane downstream from a HEPA filter can be engineered to have high external surface area and surface charge to effectively remove bacteria and viruses that are not captured in the HEPA filter, providing an additional layer of protection. This membrane can be designed with small porosity and a tortuous path and coated with a composite photocatalyst to produce a UV-transparent, functional membrane with high surface area that can be illuminated with UV light at wavelengths 222 nm, 254 nm, or 360-400 nm to provide additional biocidal activity. This membrane could optionally be in series with a membrane coated with a monolithic composite photocatalyst optimized for VOC removal. Alternately, different photoreactor system configurations can be combined to create the final system, including, for example, moving beds and fixed beds, fluidized beds, and membranes as described in the cross referenced applications.

Figure 7:
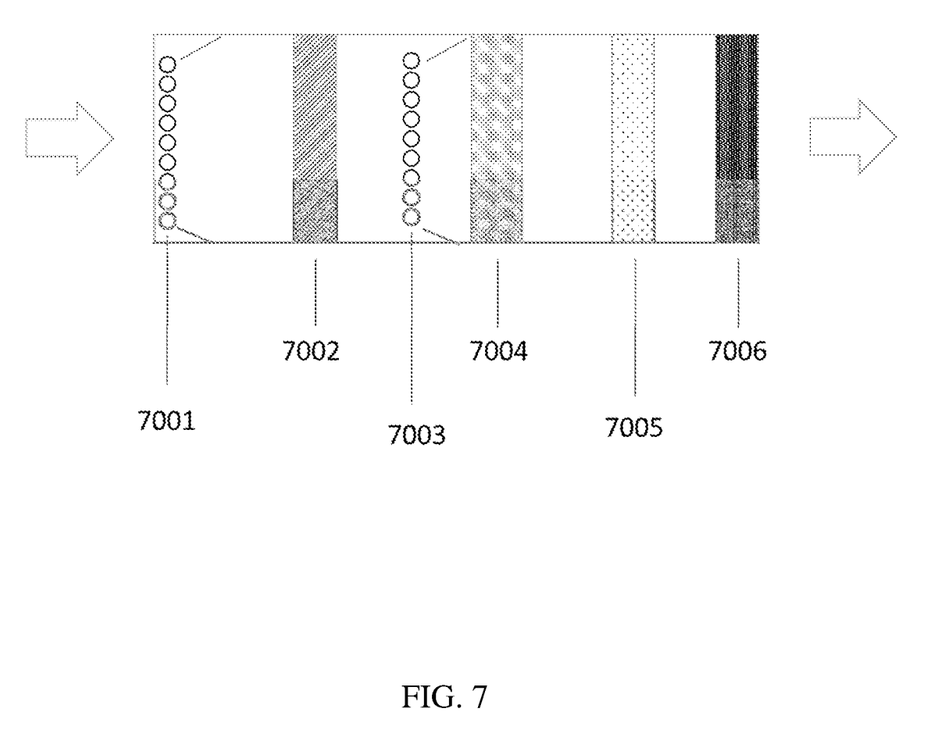
FIG. 7 shows a schematic of a photoreactive air purifier in series with other air purifying elements.

The system may comprise one or more of the following elements: a UV light source incident on a HEPA filter, a light source incident on a photocatalytically active element, a sorbent for halogenated species, and an activated charcoal filter. In one embodiment, these elements may be arranged in series with respect to the air flow as shown in FIG. 7. At the inlet side, UV lamps 7001 illuminate a HEPA filter 7002, followed by a lamps 7003 illuminating a photocatalytic element 7004. The flow may optionally be directed through a sorbent 7005 that absorbs halogenated species and finally through an activated charcoal filter 7006. The photocatalytic element may be a fixed bed containing monolithic composite photocatalysts or the monolithic composite photocatalysts may be affixed to a filter element, membrane, or other suitable support or scaffold. The photocatalytic element may also be a fluidized bed. Suitable sorbents for halogenated species, e.g., HCl, include but are not limited to $Ca(OH)_2$ and $Na_2CO_3$. The system disables virus particles on the HEPA filter rendering the filter safe to handle and dispose of. The sorbent removes trace halogenated species, including HCl that may form upon complete mineralization of halogenated species, e.g., halogenated hydrocarbons. The optional activated carbon filter removes trace intermediate species not fully mineralized.

Figure 8:
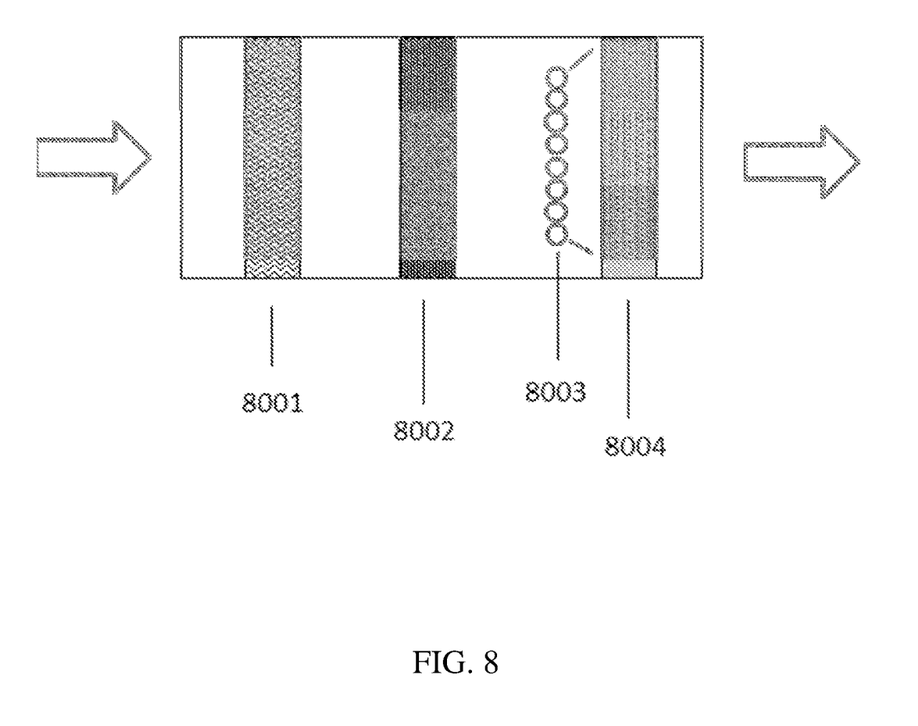
FIG. 8 shows an alternative schematic of a photoreactive air purifier in series with other air purifying elements.

In another embodiment, these elements may be arranged in series with respect to the air flow as shown in FIG. 8. A MERV 13 filter 8001 is used to capture particles. The air flow is then directed through a carbon filter 8002 and finally through a photocatalytic fluidized bed 8004 illuminated with UVA lamps 8003 for pathogen and VOC abatement.

The subject invention may be embodied in the preceding examples that are by no means restrictive, but intended to illustrate the invention. Embodiments herein described can be combined in part or in whole while still being part of the described invention. It will be clear that the described invention is well adapted to achieve the purposes described above, as well as those inherent within. The citation of any publication is for its disclosure prior to the filing date and should not be construed as an admission that the present invention is not entitled to antedate such publication by virtue of prior invention. Numerous other changes may be made which will readily suggest themselves to those skilled in the art and which are encompassed both in the spirit of the disclosure above and the appended claims.

What is claimed is:

1. A photocatalytic reactor apparatus for performing abatement of volatile organic compounds and pathogens in a fluid stream, comprising: (a) a fluidizable media comprising a monolithic composite photocatalyst, the monolithic composite photocatalyst comprising photoactive nanocrystals and a non-photoactive porous support for the photoactive nanocrystals, the monolithic composite photocatalyst having a $N_2$ BET surface area from 50-600 $m^2/g$ and with attrition less than 3 wt %/h, (b) a photoreactor that contains said monolithic composite photocatalyst and through which at least a first portion of the fluid stream flows, the photoreactor further providing dual illumination sources and non-imaging optics that direct photocatalytic illumination with wavelengths in the range of 350-420 nm and germicidal illumination with wavelengths in the range of 190-280 nm throughout the monolithic composite photocatalyst, and (c) a mechanical means to fluidize the monolithic composite photocatalyst and contact it with the first portion of the fluid stream.

2. The photocatalytic reactor apparatus of claim 1, wherein the fluidizable media has an isoelectric point above pH 6.

3. The photocatalytic reactor apparatus of claim 1, wherein the photoreactor has both monolithic composite photocatalyst media and non-photocatalytic media contained therein, further wherein the non-photocatalytic media has an isoelectric point above pH 6.

4. The photocatalytic reactor apparatus of claim 1, wherein the reactor system has both monolithic composite photocatalyst media and non-photocatalytic media contained therein, further wherein the non-photocatalytic media has an isoelectric point above pH 6 and an imaginary refractive index k less than 0.1 in the 250-280 nm wavelength range.

5. The photocatalytic reactor apparatus of claim 1, wherein the photoreactor further has a means of providing hydrogen peroxide or ozone into the photoreactor system.

6. The photocatalytic reactor apparatus of claim 1, wherein the photoreactor incorporates a bypass that allows a second portion of the fluid stream to flow in an alternate pathway not through the monolithic composite photocatalyst containing chamber of the system.

7. The photocatalytic reactor apparatus of claim 6, wherein the system incorporates a sensor that measures one or more characteristics of the fluid stream or of the fluidizable media providing feedback that is used to control the amount of the first portion of the fluid stream through the monolithic composite photocatalyst containing chamber and the amount of the second portion of the fluid stream through the bypass.

8. The photocatalytic reactor apparatus of claim 7, wherein the sensor is a PID gas sensor measuring composition of volatile organic species in the fluid stream.

9. The photocatalytic reactor apparatus of claim 7, wherein the sensor measures changes in color or optical transmission of the monolithic composite photocatalyst contained in the photoreactor or optical transmission through the monolithic composite photocatalyst contained in the photoreactor.

10. The photocatalytic reactor apparatus of claim 6, wherein the second portion of the fluid stream is diverted through the bypass when the conversion efficiency of one or more gas phase species in the fluid stream of the photoreactor falls below 90%.

11. The photocatalytic reactor apparatus of claim 6, wherein the second portion of the fluid stream is diverted through the bypass when the conversion efficiency of one or more gas phase species in the fluid stream of the photoreactor falls below 75%.

12. The photocatalytic reactor apparatus of claim 6, wherein a portion of the flow through the photoreactor is diverted through the bypass when the conversion efficiency of one or more gas phase species in the fluid stream of the photoreactor falls below 50%.

13. A fluid purification apparatus for performing abatement of volatile organic compounds and pathogens in a fluid stream, the apparatus comprising; a plurality of reactor chambers, each having a function selected from the group consisting of volatile organic compound abatement and pathogen abatement, at least one of the reactor chambers comprising: (a) a fluidizable media comprising a monolithic composite photocatalyst, the monolithic composite photocatalyst comprising photoactive nanocrystals and a non-photoactive porous support for the photoactive nanocrystals, the monolithic composite photocatalyst having a $N_2$ BET surface area from 50-600 $m^2/g$ and with attrition less than 3 wt %/h, (b) a photoreactor that contains said monolithic composite photocatalyst and through which at least a first portion of the fluid stream flows, further providing an illumination source and non-imaging optics that direct photocatalytic illumination throughout the monolithic composite photocatalyst, and (c) a mechanical means to fluidize the monolithic composite photocatalyst and contact it with the first portion of the fluid stream.

14. The fluid purification apparatus of claim 13, wherein at least two reactor chambers are arranged in series.

15. The fluid purification apparatus of claim 14, wherein both reactor chambers contain a fluidizable media comprising a monolithic composite photocatalyst with a $N_2$ BET surface area from 50-600 $m^2/g$ and with attrition less than 3 wt %/h, wherein one or more of the following differ by more than 10% between the two reactor chambers: $N_2$ BET surface area of the monolithic composite photocatalyst, pore size of the monolithic composite photocatalyst, and composition of the monolithic composite photocatalyst.

16. The fluid purification apparatus of claim 14, wherein a first reactor chamber of the two reactor chambers is used for pathogen abatement, further wherein the illumination wavelength range in the first reactor chamber is from 190-280 nm, and further wherein the illumination wavelength range in the second of the two reactor chambers is 350-420 nm.

17. The fluid purification apparatus of claim 14, wherein a first reactor chamber of the two reactor chambers is used for pathogen abatement, further wherein the fluidizable media in the first reactor chamber comprises a material selected from the group consisting of zinc oxide, zirconium oxide, aluminum oxide, iron(III) oxide, copper(II) oxide, lanthanum (III) oxide, magnesium oxide, and mixtures thereof.

18. The fluid purification apparatus of claim 14, wherein the two reactor chambers are of different diameters to provide fluidization of media of different densities or particle sizes.

19. The fluid purification apparatus of claim 13, wherein at least two of the reactor chambers are arranged in parallel with a manifold that connects the inlets and outlets of each reactor chamber.

20. The fluid purification apparatus of claim 19, wherein the manifold can be manipulated to direct at least a flow of a second portion of the fluid stream from the outlet of one reactor to the inlet of the other reactor.

21. The fluid purification apparatus of claim 19, wherein the apparatus incorporates a sensor that measures one or more characteristics of the first portion of the fluid stream or of the fluidizable media providing feedback that is used to control when the flow of the second portion of the fluid stream from the outlet of one reactor is directed to the inlet of the other reactor.

22. The fluid purification apparatus of claim 19, wherein the sensor is a PID gas sensor measuring composition of volatile organic species in the fluid stream.

23. The fluid purification apparatus of claim 19, wherein the sensor measures changes in color or optical transmission of the monolithic composite photocatalyst contained in the system or optical transmission through the monolithic composite photocatalyst contained in the system.

24. The fluid purification apparatus of claim 19, wherein the second portion of the fluid stream from the outlet of one reactor is directed to the inlet of the other reactor when the conversion efficiency of one or more gas phase species of one reactor falls below 90%.

25. The fluid purification apparatus of claim 19, wherein the second portion of the fluid stream from the outlet of one reactor is directed to the inlet of the other reactor when the conversion efficiency of one or more gas phase species of one photoreactor falls below 75%.

26. The fluid purification apparatus of claim 19, wherein the second portion of the fluid stream from the outlet of one reactor is directed to the inlet of the other reactor when the conversion efficiency of one or more gas phase species of one photoreactor falls below 50%.

27. A fluid handling apparatus including a photocatalytic reactor system, comprising: (a) a fluidizable photocatalyst with a $N_2$ BET surface area from 50-600 $m^2/g$ and with attrition less than 3 wt %/h, (b) a photoreactor that contains said photocatalyst, providing an illumination source and non-imaging optics that direct photocatalytic illumination throughout the photocatalyst, and (c) a mechanical means to fluidize the photocatalyst, further wherein all or a portion of a fluid stream may be directed through the photocatalytic reactor system, thereby performing abatement of volatile organic compounds and pathogens in the fluid stream.

28. The fluid handling apparatus of claim 27, wherein the fluid handling system has a sensor that measures one or more characteristics of the fluid stream or of the fluidizable medium, thereby providing feedback that is used to control the amount of the fluid stream flowing through the photocatalyst containing chamber.

29. The fluid handling apparatus of claim 28, wherein the sensor is a PID gas sensor measuring composition of volatile organic species in the fluid stream.

30. The fluid handling apparatus of claim 28, wherein the sensor measures changes in color of the photocatalyst contained in the photocatalytic reactor system or optical transmission through the photocatalyst contained in the photocatalytic reactor system.

* * * * *

UNITED STATES PATENT AND TRADEMARK OFFICE
CERTIFICATE OF CORRECTION

PATENT NO. : 11,958,765 B2
APPLICATION NO. : 17/579558
DATED : April 16, 2024
INVENTOR(S) : Jeffrey F. Roeder et al.

Page 1 of 1

It is certified that error appears in the above-identified patent and that said Letters Patent is hereby corrected as shown below:

On the Title Page

Please remove the information under item (63), "Related Application Data", and replace it with;
"Continuation in part of application No. 17/481,279, filed on Sept. 21, 2021.
Continuation in part of application No. 17/343,723, filed on June 9, 2021.
Continuation in part of application No. 16/987,386, filed on Aug. 6, 2020, now Pat. No. 11,857,924.
Continuation in part of application No. 16/680,495, filed on Nov. 12, 2019, now Pat. No. 11,241,671.
Continuation in part of application No. 16/212,663, filed on Dec. 6, 2018, now Pat. No. 11,052,385.
Continuation in part of application No. 16/147,536, filed on Sept. 28, 2018."

Add the following information to item (60), relating to Provisional Applications;
"Provisional application No. 63/139,145, filed on Jan. 19, 2021.
Provisional application No. 63/036,651, filed on June 9, 2020.
Provisional application No. 62/883,286, filed on Aug. 6, 2019.
Provisional application No. 62/760,428, filed on Nov. 13, 2018.
Provisional application No. 62/595,261, filed on Dec. 6, 2017.
Provisional application No. 62/564,408, filed on Sept. 28, 2017."

Signed and Sealed this
Thirteenth Day of August, 2024

Katherine Kelly Vidal
*Director of the United States Patent and Trademark Office*